United States Patent [19]
Harte

[11] Patent Number: 5,708,713
[45] Date of Patent: Jan. 13, 1998

[54] METHOD FOR MONITORING A SIGNAL TO BE TRANSMITTED VIA AT LEAST ONE TELECOMMUNICATION LINK, A MONITORING SYSTEM, A MONITOR CONTROLLING DEVICE AND PROCESSING MEANS

[75] Inventor: René Antonie Harte, Schiedam, Netherlands

[73] Assignee: Koninklijke PTT Nederland N.V., Groningen, Netherlands

[21] Appl. No.: 639,036

[22] Filed: Apr. 16, 1996

[30] Foreign Application Priority Data

Apr. 27, 1995 [NL] Netherlands ............... 1000238

[51] Int. Cl.⁶ .................................................. H04K 1/00
[52] U.S. Cl. ................................................ 380/23; 380/49
[58] Field of Search ................................ 380/23, 49, 10

[56] References Cited

U.S. PATENT DOCUMENTS 5,361,062  11/1994  Weiss et al. ........................ 340/825

FOREIGN PATENT DOCUMENTS 0573735  12/1993  European Pat. Off. .
2691029  11/1993  France .
4139265   7/1992  Germany .

*Primary Examiner*—David C. Cain
*Attorney, Agent, or Firm*—Michaelson & Wallace; Peter L. Michaelson

[57] ABSTRACT

Prior art methods used for monitoring, via monitoring means, signals which are to be transmitted via telecommunication links and with said signals each comprising a signalling signal and a content signal, require that the processing means which are required for monitoring are either situated in the vicinity of the monitoring means or must be coupled to the monitoring means via leased-lines. By having the monitoring means generate a further signalling signal, dependent upon a code word related to a signalling signal, and consequently transmitting, dependent upon the further signalling signal, a content signal which is to be monitored to the processing means, a substantial more efficient method is obtained as both means can be coupled via a public telephony network.

Furthermore, the possibility arises not only to transmit a content signal which is to be monitored to the processing means but also a signalling signal, especially if the telephony network is a so-called ISDN network which uses one or two B channels and one D channel for each telecommunication link which has been established and has to be monitored.

18 Claims, 2 Drawing Sheets

METHOD FOR MONITORING A SIGNAL TO BE TRANSMITTED VIA AT LEAST ONE TELECOMMUNICATION LINK, A MONITORING SYSTEM, A MONITOR CONTROLLING DEVICE AND PROCESSING MEANS

BACKGROUND OF THE INVENTION

The invention relates to a method for monitoring, via monitoring means, a signal which is to be transmitted via at least one telecommunication link and with said signal comprising at least a signalling signal and a content signal, which method comprises the steps of:
- detecting, by the monitoring means, at least one code word situated in the signalling signal, and
- monitoring, by the monitoring means, dependent on the code word to be detected, at least a part of the content signal.

Such a method is generally known and is for example used by a network operator after installing a generally available monitoring software function in a telecommunication exchange. Via such a telecommunication exchange, telecommunication connections are mutually connected-through so that one signal originating from a source can be transmitted to a destination via the telecommunication link consequently obtained. For this purpose, the signal comprises a signalling signal which for example indicates in a coded manner the destination and the source, and the signal furthermore comprises a content signal which for example corresponds to a conversation to be held between the source and the destination.

The monitoring means which are for example realized by means of a processing system situated in the telecommunication exchange and loaded with the monitor software function, then detect in a code word situated in the signalling signal, such as for example the part of the signalling signal which indicates the source or the destination in a coded manner, by selecting the code word in question, of the signalling signals to be transmitted, via each telecommunication link realized via the telecommunication exchange, and compare this with code words stored in a code word memory. In case equality is established, a part of the content signal flowing via said telecommunication link in question is deflected by said monitoring means, whereafter said part of the content signal is for example examined by telecommunication experts, for example, in order to verify whether the users are offered sufficient quality. This of course has to take place without causing any trouble to the users situated at the source or the destination. As said telecommunication experts preferably examine the content signals at one or at a few locations, instead of having to travel to other telecommunication exchanges at regular times, the content signals to be examined each have to be supplied, for each telecommunication link, via a so-called leased-line to one of the locations; with each leased-line continuously being reserved for a telecommunication link whether said link has been established or not.

Said known method inter alia has as a disadvantage that when using said method the leased-lines are being used in a very inefficient manner.

SUMMARY OF THE INVENTION

An object of the invention inter alia is to provide a method as indicated in the preamble with which monitoring is realized in a more efficient manner.

The method in accordance with the invention characterized in that the method comprises the steps of:

generating, by the monitoring means, dependent on the code word to be detected, a further signalling signal, and transmitting, by the monitoring means, dependent on the further signalling signal, the part of the content signal which is to be monitored to processing means defined by the further signalling signal.

As the monitoring means generate the further signalling signal, dependent on the code word to be detected, and then transmit, dependent on said further signalling signal, the part of the content signal which is to be monitored, it is attained that the monitoring means and the processing means need no longer be mutually connected via inefficient leased-lines but that they can be coupled via for example a telephony network. The further signalling signal then defines the destination of the part of the content signal which is to be monitored in the form of for example a telephone number which indicates the location of the processing means.

The invention is inter alia based on the insight that it is well possible to transmit especially the part of the content signal which is to be monitored via a telephony network to processing means.

Consequently, the problem of monitoring in an inefficient manner via leased-lines is solved by coupling the monitoring means and the processing means via a telephony network.

Furthermore, when leased-lines are used, it is only possible in a very complicated manner to supply not only the part of the content signal which is to be monitored to the processing means but to supply a part of the signalling signal to the processing means as well. The latter is especially the case when a large part of the signalling signal, which for example indicates the destination and the source in a coded manner, is to be transmitted. When using the method in accordance with the invention this is simplified considerably, especially when the telephony network is a so-called ISDN network, which mutually couples the monitoring means and the processing means via a set of one or two B channels and one D channel required for each telecommunication link which has been established and has to be monitored.

A first embodiment of the method in accordance with the invention is characterized in that the method comprises the steps of transmitting a first authentication code from one side to another side, generating, at the other side, dependent on a key code and the first authentication code, a second authentication code, transmitting the second authentication code from the other side to the one side, generating at the one side dependent on the key code and the first authentication code, a third authentication code, comparing the second and the third authentication code at the one side, with, only in case of equality of the second and the third authentication code the part of the content signal which is to be monitored being transmitted to the processing means.

As the first authentication code is transmitted from the one side to the other side, at the other side the second authentication code is generated, dependent on the key code and the first authentication code, from the other side to the one side said second authentication code is transmitted, at the one side the third authentication code is generated, dependent on the key code and the first authentication code, and at the one side the second and the third authentication code are compared, at the one side an authentication process takes place as only after established equality of the second and the third authentication code the part of the content signal which is to be monitored is transmitted to the processing means. In this context, the processing means and the monitoring means respectively are situated either at the one side and at the other side respectively, or either at the other side and at the one side respectively. Preferably, however, the authentication process will be executed twice, once from for example the processing means with the key code and the first, second and third authentication code, and once again from the monitoring means with a further key code and a fourth, fifth and sixth authentication code.

A second embodiment of the method in accordance with the invention is characterized in that the method comprises the steps of generating, by the monitoring means, a describing signal, dependent on the code word to be detected, before the part of the content signal which is to be monitored is transmitted to the processing means, and transmitting, by the monitoring means, the describing signal to the processing means.

As the monitoring means generate a describing signal, dependent on the code word to be detected, which signal is transmitted by the monitoring means to the processing means, before the part of the content signal which is to be monitored is transmitted to the processing means, the possibility is created to be capable of supplying in a very extensive manner, in advance, data concerning the content signal which is to be monitored. If the telephony network situated between the monitoring means and the processing means is a so-called ISDN network, said describing signal will generally be sent via a B channel, as well as the part to be monitored of the content signal, and contrary to the further signalling signal which will generally be transmitted via a D channel.

A third embodiment of the method in accordance with the invention is characterized in that the method comprises the steps of buffering, by the monitoring means, the part of the content signal which is to be monitored in a memory, and reading out, by the monitoring means, the memory and consequently transmitting in a delayed manner in time the part of the content signal which is to be monitored to the processing means.

As the part of the content signal which is to be monitored is buffered in a memory by the monitoring means, and as only after some time this memory is read out and consequently the part of the content signal which is to be monitored is transmitted in a delayed manner in time to the processing means, first of all one or more authentication processes can take place and the describing signal can be transmitted without the smallest chance that a small part of the part of the content signal which is to be monitored gets lost. In this context, however, it is disadvantageous that as a consequence of using the memory the part of the content signal which is to be monitored is no longer followed in real-time but is being followed with for example a delay of some seconds. The latter could however be cancelled-out by bridging, at a certain moment, the memory, in which case the part stored in the memory can be followed either at a later moment or can be considered as being lost.

A fourth embodiment of the method in accordance with the invention is characterized in that the further signalling signal is provided with a destination code which defines the processing means and with a monitor code related to the code word and with a signal type code which defines a signal type.

As the further signalling signal is provided with a destination code which defines the processing means, and with a monitor code related to the code word, and with a signal type code which defines a signal type, the processing means already obtain general information before an authentication process has taken place, as a result of which the processing means can be adjusted, dependent on the monitor code and the signal type code, in an advantageous manner and can be prepared for the arriving part of the content signal which is to be monitored.

The invention furthermore relates to a monitoring system provided with monitoring means for monitoring a signal to be transmitted via at least one telecommunication link which signal at least comprises a signalling signal and a content signal, and provided with processing means which can be coupled to the monitoring means, said monitoring means being provided with a detecting device for detecting at least one code word situated in the signalling signal, and a monitoring device for monitoring, dependent on the code word to be detected, at least a part of the content signal, and said processing means being provided with a processing device for processing at least the part of the content signal which is to be monitored.

Such a monitoring system is generally known and for example arises when a network operator installs a generally available monitor software function in a telecommunication exchange. Via such telecommunication exchange, telecommunication connections are mutually connected-through, in order that a signal originating from a source via the telecommunication link consequently obtained can be sent to a destination. For this purpose the signal consists of a signalling signal which for example indicates in a coded manner the destination and the source, and the signal furthermore comprises a content signal which for example corresponds with a conversation to be held between the source and the destination.

The monitoring means comprise the detecting device which is for example realized by means of a processing system situated in the telecommunication exchange and loaded with the monitoring software function, and then detect a code word situated in the signalling signal, such as for example the part of the signalling signal which in a coded manner indicates the source or the destination, by selecting the code word in question of each telecommunication link realized via the telecommunication exchange from the signalling signal to be transmitted via said telecommunication link and comparing it to code words stored in a code word memory. In case of established equality, at least a part of the content signal flowing via the telecommunication link in question is then deflected by the monitoring devices comprising monitoring means, after which said part of the content signal is for example examined by telecommunication experts, for example, in order to ascertain whether the users is offered sufficient quality. This of course has to take place without disturbing the users situated at the source or at the destination in any manner. For this purpose, the monitoring device is for example realized by means of a three-way circuit known to those skilled in the art, of which two input/outputs are situated in a serial manner in the telecommunication link to be established and of which a third input/output is used for the part of the content signal which is to be monitored; and this takes place in such a manner known to those skilled in the art that this third input/output only acts as an output.

The processing means are provided with the processing device for processing at least the part of the content signal which is to be monitored. As the telecommunication experts preferably examine the content signals on one or a few locations, instead of having to travel to telecommunication exchanges at very regular intervals, the content signals to be examined of each telecommunication link are supplied via a so-called leased-line to at least one processing device situated on one of the locations. In this case, each leased-line is constantly reserved for a telecommunication link whether this link has been established or not.

Said prior-art monitoring system inter alia has as a disadvantage that when using said monitoring system, the leased-lines are used in a very inefficient manner.

Furthermore, anther object of the invention is to provide a monitoring system of the kind as mentioned in the preamble with which monitoring can be realized in a more efficient manner.

The monitoring system in accordance with the invention is characterized in that the monitoring means are provided with a monitor controlling device comprising

- a generating device for generating, dependent on the code word to be detected, a further signalling signal, and
- a transmitting device for transmitting, dependent on the further signalling signal, at least the part of the content signal which is to be monitored to the processing means defined by the further signalling signal.

As the monitoring means comprise the monitor controlling device which is provided with the generating device for generating, dependent on the code word to be detected, the further signalling signal, and which is provided with the transmitting device for transmitting, dependent on the further signalling signal, at least the part of the content signal which is to be monitored, to the processing means defined by the further signalling signal, it is attained that the monitoring device and the processing device need no longer be mutually coupled via inefficient leased-lines, but that they can for example be coupled via a telephony network. The further signalling signal in this case defines the destination of the part of the content signal which is to be monitored in the form of for example a telephone number which indicates the location of the processing means.

Therefore, the invention is inter alia based on the insight that it is well possible to transmit especially the part of the content signal which is to be monitored via a telephony network to the processing device.

Consequently, the problem of monitoring in an inefficient manner via leased-lines is solved by coupling the monitoring device and the processing device via a telephony network, in which case the monitoring means are to be provided with the monitor controlling device.

Furthermore, when using leased-lines, it is only possible in a very complicated manner to not only supply a part of the content signal to the processing means, but a part of the signalling signal as well. The latter is especially the case when a large part of the signalling signal, which for example indicates the destination and the source in a coded manner, are to be transmitted. By using the monitoring system in accordance with the invention this is considerably simplified, especially when the telephony network is a so-called ISDN network, which mutually couples the monitoring device and the processing means via a set of one or two B channels and one D channel required for each telecommunication link which has been established and has to be monitored.

A first embodiment of the monitoring system in accordance with the invention is characterized in that the monitor controlling device is provided with an authentication receiving device for receiving an authentication code originating from the processing means, an authentication calculating device for calculating, dependent on a key code and the first authentication code, a second authentication code, an authentication transmitting device for transmitting the second authentication code to the processing means, and a further authentication receiving device for receiving an authentication permission code originating from the processing means, with the processing means being provided with an authentication generating device for generating the first authentication code, a further authentication calculating device for calculating, dependent on the key code and the first authentication code, a third authentication code, a still further authentication receiving device for receiving the second authentication code originating from the monitor controlling device, an authentication comparing device for comparing the second and the third authentication codes, and a further authentication transmitting device for transmitting, in case of equality of the second and the third authentication codes, to the monitor controlling device, the authentication permission code for granting permission for transmitting at least the part of the content signal which is to be monitored to the processing means.

As the monitor controlling device is provided with the authentication receiving device, the authentication calculating device, the authentication transmitting device, and the further authentication receiving device, and as the processing means are provided with the authentication generating device, the further authentication calculating device, the still further authentication receiving device, the authentication comparing device and the further authentication transmitting device, at the side of the processing means an authentication process takes place as only after established equality of the second and the third authentication codes the part of the content signal which is to be monitored is transmitted to the processing devices. As an alternative, the authentication process could take place at the side of the monitoring means, in which case the processing means are to be provided with the authentication receiving device, the authentication calculating device, the authentication transmitting device, and the further authentication receiving device, and the monitor controlling device is to be provided with the authentication generating device, the further authentication calculating device, the still further authentication receiving device, the authentication comparing device, and the further authentication transmitting device. However, preferably the authentication process will be executed twice: once from for example the processing means with the key code and the first, second and third authentication code, and once again from the monitoring means with a further key code and a fourth, a fifth, and sixth authentication code.

A second embodiment of the monitoring system in accordance with the invention is characterized in that the monitor controlling device is provided with a further generating device for generating, before at least the part of the content signal which is to be monitored is transmitted to the processing means, dependent on the code word to be detected, a describing signal, and a further transmitting device for transmitting the describing signal to the processing device.

As the monitor controlling device is provided with the further generating device for generating, before at least the part of the content signal which is to be monitored is transmitted to the processing device, dependent on the code word to be detected, the describing signal, and is provided with the further transmitting device for transmitting the describing signal to the processing device, the possibility is created of being able to provide, in a very extensive manner and, in advance, data concerning the part of the content signal which is to be monitored. If the telephony network situated between the monitoring means and the processing means is a so-called ISDN network, said describing signal will generally be transmitted via a B channel, as well as the part of the content signal which is to be monitored, and contrary to the further signalling signal which will generally be sent via a D channel.

A third embodiment of the monitoring system in accordance with the invention is characterized in that the monitor controlling device is provided with

- a memory device for buffering at least the part of the content signal which is to be monitored, and
- a memory controlling device for reading out the memory device for consequently transmitting at least the part of the content signal which is to be monitored delayed in time to the processing device.

As the monitor controlling device is provided with the memory device for buffering at least the part of the content signal which is to be monitored, and is provided with the memory controlling device for reading out the memory device for consequently transmitting at least the part of the content signal delayed in time to the processing means, first of all one or more authenticating processes can take place and the describing signal can be transmitted without the smallest chance that a small part of that part of the content signal which is to be monitored gets lost. The memory controlling device in this case has to be coupled to the further authentication receiving device and/or to the further generating device and/or to the further transmitting device. In this context it is disadvantageous that as a consequence of using the memory device, the part of the content signal which is to be monitored is no longer followed real-time, but with a small delay of for example a few seconds. This could however be cancelled-out by bridging, at a certain moment, the memory device, in which case the part stored in the memory device can be followed either at a later moment or can be considered as being lost. A bridging signal required for bridging the memory device will preferably be transmitted from the side of the processing means.

A fourth embodiment of the monitoring system in accordance with the invention is characterized in that the monitor controlling device is provided with

- a first code generating device for generating a destination code which defines the processing device,
- a second code generating device for generating a monitor code related to the code word, and
- a third code generating device for generating a signal type code which defines a signal type, with the processing means being provided with

- a first code detecting device for detecting the monitor code related to the code word, and
- a second code detecting device for detecting the signal type code which defines a signal type.

As the monitor controlling device is provided with the first, second and third code generating devices, and the processing means are provided with the first and second code detecting devices, the processing means already obtain general information before an authentication process took place, as a result of which a processing device can for example already be adjusted, dependent on the monitor code and the signal type code, in an advantageous manner and can be prepared for the arriving part of the content signal which is to be monitored.

The invention still further relates to a monitor controlling device for coupling to monitoring means for monitoring a signal to be transmitted via at least one telecommunication link which comprises at least a signalling signal and a content signal, said monitoring means being provided with

- a detecting device for detecting at least one code word situated in the signalling signal, and
- a monitoring device for monitoring, dependent on the code word to be detected, at least a part of the content signal.

The monitor controlling signal in accordance with the invention is characterized in that the monitor controlling device is provided with

- a generating device for generating, dependent on the code word to be detected, a further signalling signal, and
- a transmitting device for transmitting, dependent on the further signalling signal, at least the part of the content signal which is to be monitored to processing means defined by the further signalling signal.

A first embodiment of the monitor controlling device in accordance with the invention is characterized in that the monitor controlling device is provided with

- an authentication receiving device for receiving a first authentication code originating from the processing means,
- an authentication calculating device for calculating, dependent on a key code and the first authentication code, a second authentication code,
- an authentication transmitting device for transmitting the second authentication code to the processing means, and
- a further authentication receiving device for receiving an authentication permission code originating from the processing means for obtaining permission for transmitting at least the part of the content signal which is to be monitored to the processing means.

A second embodiment of the monitor controlling means in accordance with the invention is characterized in that the monitor controlling device is provided with

- a further generating device for generating, before at least the part of the content signal which is to be monitored is transmitted to the processing means, dependent on the code word to be detected, a describing signal, and
- a further transmitting device for transmitting the describing signal to the processing means.

A third embodiment of the monitor controlling device in accordance with the invention is characterized in that the monitor controlling device is provided with

- a memory device for buffering at least the part of the content signal which is to be monitored, and
- a memory controlling device for reading out the memory device for consequently transmitting delayed in time the part of the content signal which is to be monitored to the processing device.

A fourth embodiment of the monitor controlling device in accordance with the invention is characterized in that the monitor controlling device is provided with

- a first code generating device for generating a destination code which defines the processing device,
- a second code generating device for generating a monitor code related to the code word, and a third code generating device for generating a signal type code which defines a signal type.

The invention also relates to processing means for coupling to monitoring means for monitoring a signal to be transmitted via at least one telecommunication link which comprises at least a signalling signal and a content signal, said monitoring means being provided with a detecting device for detecting at least one code word situated in the signalling signal, and a monitoring device for monitoring, dependent on the code word to be detected, at least a part of the content signal which is to be monitored, and said processing means being provided with a processing device for processing at least the part of the content signal.

The processing means in accordance with the invention are characterized in that the processing means are provided with a first code detecting device for detecting a monitor code originating from the monitoring means and related to the code word.

A first embodiment of the processing means in accordance with the invention is characterized in that the processing means are provided with a second code detecting device for detecting a signal type code originating from the monitoring means and defining a signal type.

A second embodiment of the processing means in accordance with the invention is characterized in that the processing means are provided with an authentication generating device for generating a first authentication code, a further authentication calculating device for calculating, dependent on a key code and the first authentication code, a third authentication code, a still further authentication receiving device for receiving a second authentication code originating from one of the monitoring means, an authentication comparing device for comparing the second and the third authentication codes, and a further authentication transmitting device for, in case of equality of the second and third authentication codes, transmitting to the monitoring means an authentication permission code for granting permission for transmitting at least the part of the content signal which is to be monitored to the processing means.

References

NL 1000238 (Dutch priority patent application)

All references are considered being incorporated in the present patent application.

EXEMPLARY EMBODIMENT

The invention will now be elucidated more in detail on the basis of an exemplary embodiment as shown in the Figures, in which.

Figure 1:
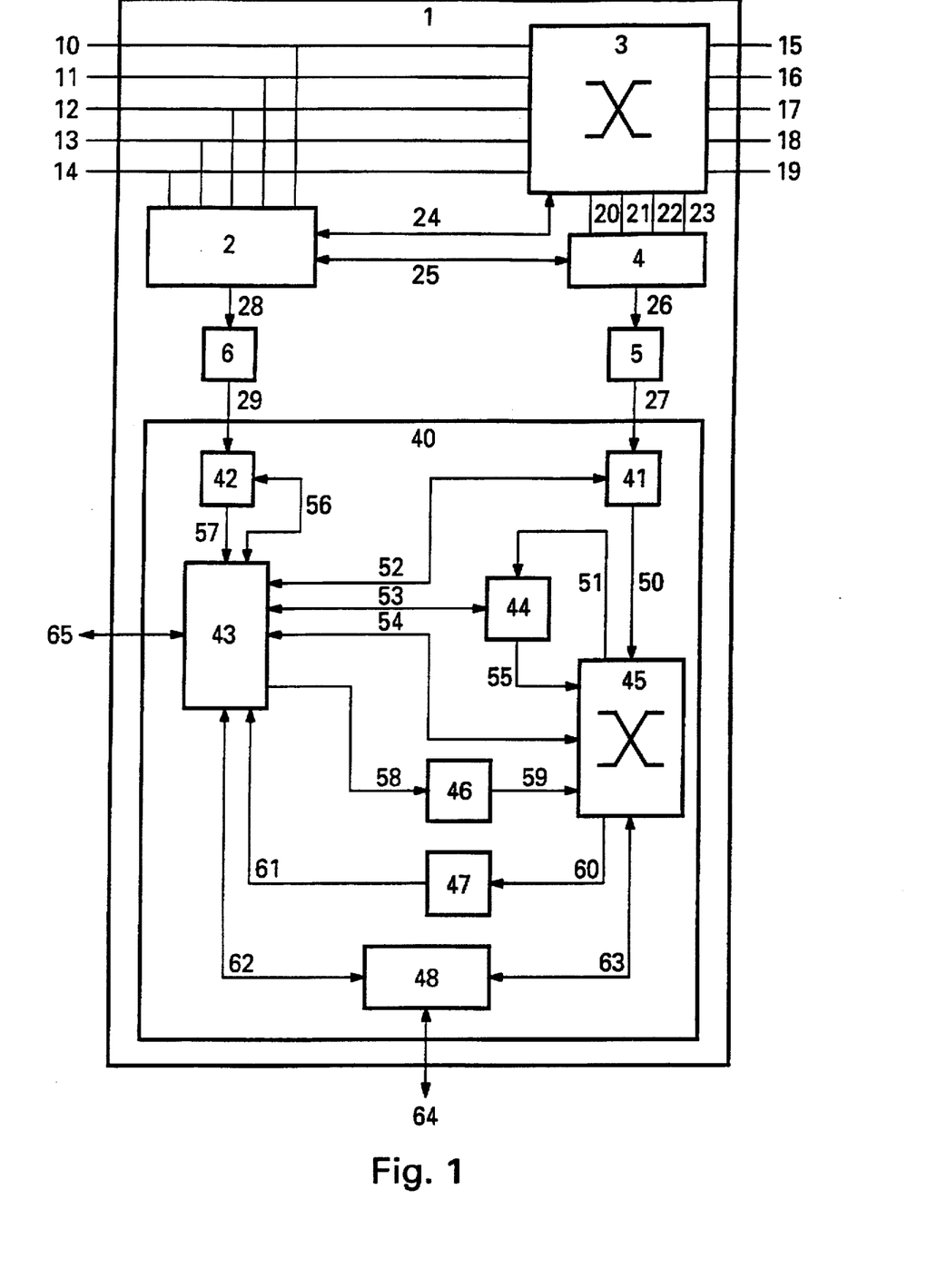
FIG. 1 shows monitoring means comprising a monitor controlling device in accordance with the invention and, FIG. 2 processing means in accordance with the invention for coupling to the monitoring means.

The monitoring means 1 as shown in FIG. 1 comprise a monitoring processor 2 which is coupled to a switch matrix 3 via a control connection 24. At the one side, switch matrix 3 is connected to telecommunication connections 10, 11, 12, 13 and 14 which are for example each coupled to a base station not shown in FIG. 1. At the other side, switch matrix 3 is connected to telecommunication connections 15, 16, 17, 18 and 19 which for example are connected to a public telephony network not shown in FIG. 1. Monitoring processor 2 is, as is the one side of switch matrix 3, connected to the telecommunication connections 10, 11, 12, 13 and 14 and is coupled via a control connection 25 to a monitoring device 4, which is coupled to switch matrix 3 via connections 20, 21, 22 and 23. An output of monitoring device 4 is coupled via a connection 26 to a data transmitting interface 5, which is coupled via a connection 27 to a data input of a monitor controlling device 40. An output of monitoring processor 2 is coupled via a connection 28 to a signalling transmitting interface 6, which is coupled via a connection 29 to a signalling input of monitor controlling device 40.

Monitor controlling device 40 comprises a data receiving interface 41 coupled to the data input, said interface being coupled via a connection 50 to a first input of insert/extract matrix 45, and comprises a signalling receiving interface 42 coupled to the signalling input, which is coupled via a connection 57 to a controlling processor 43. This is coupled via a control connection 52 to data receiving interface 41 and is coupled via a control connection 56 to a signalling receiving interface 41 and is coupled via a control connection 54 to insert/extract matrix 45. A first output of insert/extract matrix 45 is coupled via a connection 51 to an input of a buffer 44, of which an output is coupled via a connection 55 to a second input of insert/extract matrix 45. Controlling processor 43 is coupled via a control connection 53 to this buffer 44. A third input of insert/extract matrix 45 is coupled via a connection 59 to a generator 46, which is coupled via a connection 58 to controlling processor 43. A second output of insert/extract matrix 45 is coupled via a connection 60 to detector 47, which is coupled via a connection 61 to controlling processor 43, which is coupled via a connection 62 to a first input/output of a combiner 48, of which a second input/output is coupled via a connection 63 to an input/output of insert/extract matrix 45 and of which a third input/output is coupled to a connection 64 which is for example connected to an ISDN-network. Controlling processor 43 is coupled via a connection 65 to for example a data-network.

Figure 2:
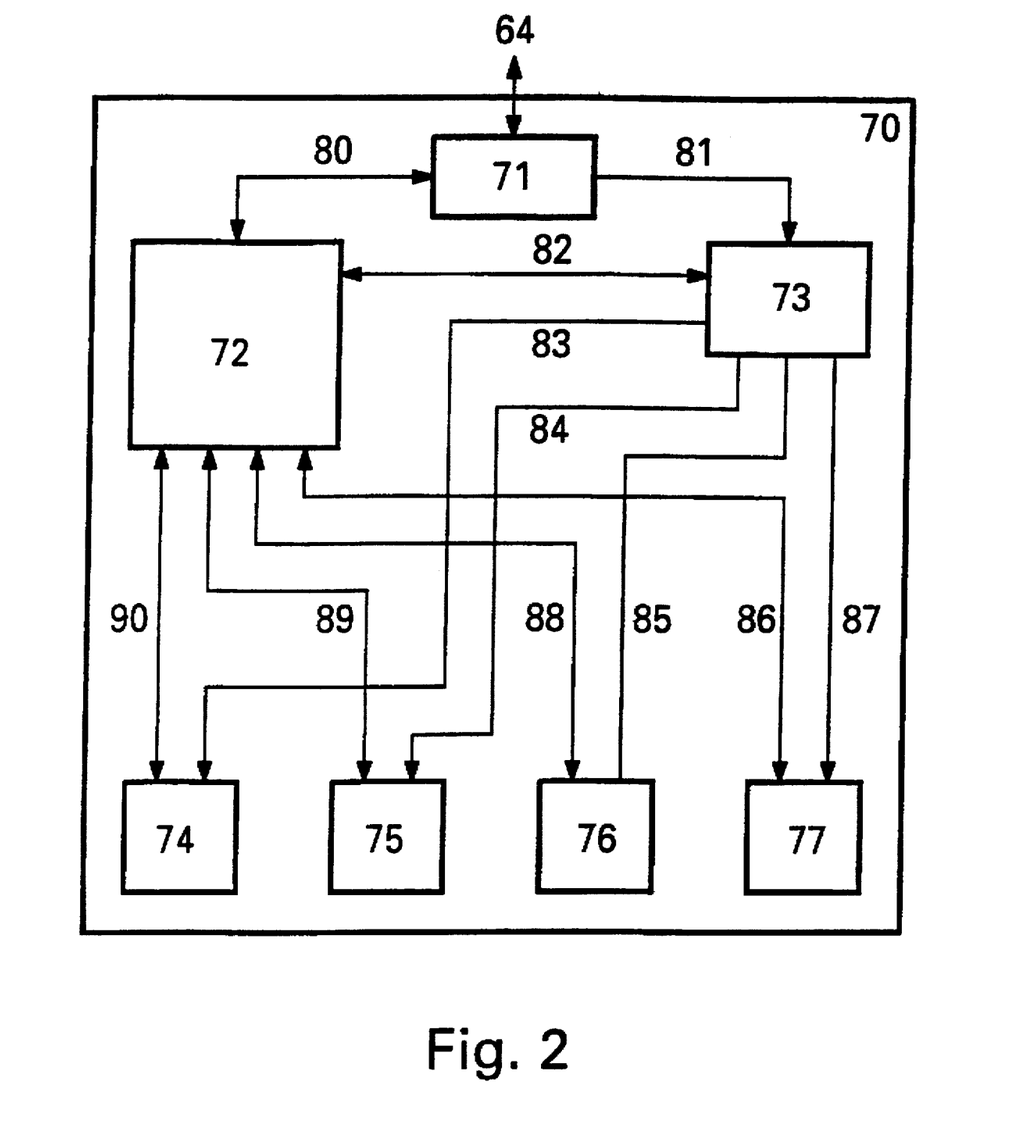

The processing means 70 as shown in FIG. 2 comprise a splitter 71, of which a first input/output is coupled to for example an ISDN network via a connection 64, of which a second input/output is coupled via a connection 80 to a processing processor 72 and of which a third input/output is coupled via a connection 81 to a distribution matrix 73. Processing processor 72 is coupled via a control connection 82 to distribution matrix 73, and is coupled via a control connection 90 to a first processing device 74, and is coupled via a control connection 89 to a second processing device 75, and is coupled via a control connection 88 to a third processing device 76, and is coupled via a control connection 86 to a fourth processing device 77. Distribution matrix 73 is coupled via a connection 83 to first processing device 74, and is coupled via a connection 84 to second processing device 75, and is coupled via a connection 85 to third processing device 76, and is coupled via a connection 87 to fourth processing device 77.

The sections related to the prior-art as shown in FIG. 1 operate as follows. Monitoring processor 2, switch matrix 3, monitoring device 4, data transmitting interface 5 and signalling transmitting interface 6 are generally known parts of for example a Mobile Switching Center (MSC) in which each time one of the telecommunication connections 10, 11, 12, 13 and 14 is connected-through to one of the telecommunication connections 15, 16, 17, 18 and 19, and vice versa, with a telecommunication link then being established from a source to a destination, via both telecommunication connections which have been connected-through. To this end, switch matrix 3 for example receives via one of the telecommunication connections 10, 11, 12, 13 and 14 a telecommunication signal originating from a base station (and in this case originating from a mobile station) with said signal comprising a signalling signal and a content signal, and switch matrix subsequently providing the connecting-through to one of the telecommunication connections 15, 16, 17, 18 and 19, in fact, dependent on a destination code related to the signalling signal (said code being the so-called b-number chosen via the mobile station).

Apart from this the possibility exists, for example if a user of a fixed terminal or a user of a mobile station indicated that he/she is dissatisfied with quality of certain established telecommunication links, to monitor an established telecommunication link via monitoring device 4. To this end the monitoring processor 2 acting as detecting device detects a code word related to the signalling signal (such as for example the a-number related to a fixed terminal or the so-called Mobile Station ISDN number (MSISDN) related to a mobile station, or the so-called International Mobile Station Identity number (IMSI), etc), for example by detecting the code word situated in each passing signalling signal and by comparing this with code words stored in a table, and by, in case of equality, controlling switch matrix 3 via control connection 24 and monitoring device 4 via control connection 25 is such manner that the connecting-through in switch matrix 3 of one of the telecommunication connections 10, 11, 12, 13 and 14 to one of the telecommunication connections 15, 16, 17, 18 and 19 takes place via monitoring device 4. Therefore, this is provided with a first monitoring unit situated between the connections 20 and 21 and with a second monitoring unit situated between the connections 22 and 23, and for example engages the first monitoring unit in response to a control signal originating from monitoring processor 2 via control connection 25, with switch matrix 3 then connecting-through, in response to a control signal originating from the monitoring processor 2 via control connection 24, one of the telecommunication connections 10, 11, 12, 13 and 14 to connection 20, and connecting-through one of the telecommunication connections 15, 16, 17, 18 and 19 to connection 21. In this manner at least a part of the content signal of the signal is deflected via monitoring device 4 and connection 26, and via monitoring processor 2 and connection 28 furthermore at least a part of the signalling signal can be deflected.

When using only this prior-art section of the entity as shown in FIG. 1 and FIG. 2, the disadvantage occurs that for example a telecommunication expert skilled in monitoring activities must either go to a telecommunication exchange for each complaint uttered by a user, where said expert will probably execute his work in a very inefficient manner, or monitoring activities take place on a central location by using leased-lines, in which case each leased-line to be used for telecommunication links which have to be monitored are used in a very inefficient manner. In the first case a prior-art processing device 74, 75, 76 or 77 is connected directly or via an interface on monitoring device 4, and in the second case this takes place via the leased-line. This disadvantage of unacceptable inefficiency is however avoided if monitoring means 1 are supplemented by the monitor controlling device 40.

The entity shown in FIG. 2 and the monitoring means 1 supplemented by monitor controlling device 40, operate as follows. The part of the content signal which is to be monitored is supplied via connection 26, data transmitting interface 5 and connection 27 to the data input of monitor controlling device 40, and the part of the signalling signal which is to be monitored (possibly supplemented by a date code, a time code, an operators code, a base station code etc) is supplied via connection 28, signalling transmitting interface 6 and connection 29 to the signalling input of monitor controlling device 40. Signalling receiving interface 42 receives said possibly supplemented part of the signalling signal which is to be monitored, informs controlling processor 43 thereof via control connection 56 and transmits the entire signal (possibly phased) to controlling processor 43. Data receiving interface 41 receives the part of the content signal which is to be monitored, informs controlling processor 43 thereof via control connection 52 and transmits the entire signal via connection 50 to the first input of insert/extract matrix 45. In response to a control signal originating from controlling processor 43 and transmitted via control connection 54, insert/extract matrix 45 couples the first input to the first output as a consequence of which the part of the content signal which is to be monitored is supplied, via connection 51, to buffer 44 which buffers said signal and acts as memory device.

Meanwhile, controlling processor 43 which acts as generating device generates a further signalling signal, in response to the code word related to the signalling signal (such as for example the a-number related to a fixed terminal, or the so-called Mobile Station ISDN number (MSISDN) related to a mobile station, or the so-called International Mobile Station Identity number (IMSI) etc), said signal comprising for example a further telephone number and transmits this via connection 62 to the first input/output of combiner 48, which supplies said signal via the third input/output to a D channel of the ISDN network via connection 64. In response to this further signalling signal the ISDN network establishes a connection to processing means 70. Insert/extract matrix 45 then couples the second input to the input/output in response to a control signal originating from controlling processor 43 and transmitted via control connection 54, and buffer 44 supplies, in response to a control signal originating from a controlling processor 43 acting as memory controlling device and transmitted via control connection 53, the signal stored in buffer 44 to the second input of insert/extract matrix 45, in order that the part of the content signal which is to be monitored originating from data receiving interface 41 is consequently supplied via insert/extract matrix 45, buffer 44 and again insert/extract matrix 45 and via connection 63 with a certain delay in time to the second input/output of the combiner 48 which acts as transmitting device and which transmits said signal to a B channel of the ISDN network via connection 64.

At least a part of the further signalling signal (viz. a so-called monitor source-code) and the part of the content signal which is to be monitored and delayed in time then arrive at splitter 71 of processing means 70, said splitter 71 supplying the part of the further signalling signal via connection 80 to processing processor 72 and the part of the content signal which is to be monitored and delayed in time to distribution matrix 73 via connection 81. Processing processor 72 then controls distribution matrix 73 in such manner via control connection 82 that the part of the content signal which is to be monitored and delayed in time is supplied to the processing device 74, 75, 76 or 77 destined for this.

In this manner, a telecommunication expert can monitor in a central location in an efficient manner different signals of telecommunication links established in a different manner, without the need of using inefficient leased-lines. It has to be remarked in this context that using buffer 44 is not absolutely necessary, especially if a first part of the content signal which is to be monitored may get lost.

Preferably the further signalling signal to be generated by the controlling processor 43 will be extended with for example a destination code which defines the processing device, and/or with a monitor code related to the code word, and/or with a signal type code which defines a signal type. In this context controlling processor 43 acts as first code generating device, and/or second code generating device, and/or third code generating device, and it is attained that processing means 70 can act in a more effective manner, as they can be provided with more information than is strictly necessary. Consequently, the use of the specific destination code to be monitored via a telecommunication link entails that it is no longer necessary to use a separate telephone number for each signal which is to be monitored via a telecommunication link, the use of the monitor code entails that it can be indicated whether the content signal which is to be monitored is a voice signal, a data signal or a facsimile signal, and the use of the signal type code entails that a signal type can be indicated. The processing processor 72 receives said monitor code or signal type code respectively via connection 80 and has to detect said codes and then acts as first code detecting device or as second code detecting device respectively.

In a further preferential manner, before the part of content signal to the monitored will be released by buffer 44, a describing signal will be generated by the generator 46 then acting as further generating device in response to a signal originating from controlling processor 43 and transmitted via connection 58, which describing signal is supplied to the third input of insert/extract matrix 45, which passes on said describing signal on command of a control signal originating from controlling processor 43 and transmitted via control connection 54, via connection 63 to the combiner 48 acting as further transmitting device which transmits said describing signal for example in the form of a so-called header via the B channel of the ISDN network to processing means 70. The processing device in question 74, 75, 76, or 77 in this manner is supplied with a very large amount of useful information.

In a still further preferential manner the monitor controlling device 40 will be provided with

- a detector 47 acting as authentication receiving device for receiving, via connection 60, insert/extract matrix 45, connection 63, combiner 48, connection 64, splitter 71 and connection 80, a first authentication code originating from processing processor 72,
- an authentication calculating device realized via controlling processor 43 for calculating, dependent on a key code and the first authentication code received via connection 61, a second authentication code,
- an authentication transmitting device realized via generator 46 for transmitting from controlling processor 43, via connection 58, generator 46, connection 59, insert/extract matrix 45, connection 63, combiner 48, connection 64, splitter 71 and connection 80, the second authentication code to processing processor 72, and
- a further authentication receiving device realized via detector 47 for receiving, via connection 60, insert/extract matrix 45, connection 63, combiner 48, connection 64, splitter 71 and connection 80, an authentication permission code originating from processing processor 72 and processing means 70 will be provided with

- an authentication generating device realized via processing processor 72 for generating the first authentication code,
- a further authentication calculating device realized via processing processor 72 for calculating, dependent on the key code and the first authentication code, a third authentication code,
- a still further authentication receiving device realized via splitter 71 for receiving the second authentication code originating from the monitor controlling device 40,
- an authentication comparing device realized via processing processor 72 for comparing the second and the third authentication codes, and
- a further authentication transmitting device realized via splitter 71 for, in case of equality of the second and the third authentication codes, transmitting the authentication permission code to monitor controlling device for granting permission for transmitting at least the part of the content signal which is to be monitored to the processing device in question.

In this manner, via for example a B channel of the ISDN network, first an authentication process can take place in the one direction (and preferably in both directions), before other information such as the describing signal and the part of the content signal which is to be monitored is transmitted via the B channel. Though it may be remarked as being unnecessary, this (these) authentication process(es) are totally independent from the authentication process which is executed by the ISDN network before the connection in question in the ISDN network is established via the D channel. Furthermore the authentication process(es) could be simplified by omitting the further authentication receiving device and the further authentication transmitting device, in which case establishing inequality of the second and the third authentication codes should for example have as a consequence that the connection 64 is disconnected in an automated manner. From the foregoing it also appears that combiner 48 also has a splitting function in opposite direction, and that splitter 71 also has a combiner function in opposite direction. However, for those skilled in the art these techniques belong to the prior art which can be realized by selecting, in case of the ISDN network used, a so-called ISDN DSS1 unit for both the combiner and for the splitter.

In a further preferred manner it must be possible to control the buffer 44 from the processing devices 74, 75, 76 and 77 in order to be able to cancel out following, with a delay of for example a few seconds, the part of the content signal which is to be monitored (in which case the part stored in the buffer 44 can either be followed at a later moment or can be considered as being lost). This could be realized by transmitting a signal from processing device 74, 75, 76 or 77 respectively via control connection 90, 89, 88 or 86 respectively to processing processor 72, which in response thereto transmits a signal via connection 80, splitter 71, connection 64, combiner 48, combiner 63, insert/extract matrix 45, connection 60, detector 47 and connection 61 to controlling processor 43, which in response thereto supplies a bridging signal to buffer 44 via control connection 53, which as a result thereof couples-through its connections 51 and 55 without any buffering taking place any more. As an alternative, controlling processor 43 could control insert/extract matrix 45 in such manner that the first input and the input/output hereof are being coupled-through, with buffer 44 being excluded which has of course the same consequences as having a certain bridging between the input and the output taking place in buffer 44.

In principle therefore different monitor controlling devices can be coupled to the same processing means, with only the number of processing devices in the controlling devices having to be increased. Also, different monitor controlling devices can be coupled to one or more monitor controlling devices. Via connection 65 in each monitor controlling device 40 a code word can be added or removed, and a further signalling signal and/or describing signal and/or a destination code and/or a monitor code and/or a signal type code etc can for example be changed for each code word (in practice, of course, each controlling processor 43, after the monitoring processor has already done this, will again examine whether a code word belongs to a table of code words stored in a code word memory). If this is the case, for example from processing processor 72 via a connection not shown in the FIGs, the table of code words related to the monitoring processor 2 should also be adapted.

Generally, signals will be transmitted multiplexed in time via the telecommunication connections 10 to 19 inclusive, though it is also possible to use physically separated connections for each telecommunication connection. Connection 27 and connection 64 for example each are a 2 Mbit/s connection (a so-called 30 B+D connection), and connection 29 and connection 65 each are a V24 connection. In this context different signals will therefore be transmitted multiplexed in time. Of course, here again, it is also possible to use different physically separated connections. This of course also has consequences for the constitution of the monitor controlling device 40, in which for example insert/extract matrix 45 and buffer 44 will each be present once in case of the signals being multiplexed in time, whereas these units must be used for each connection in case of physically separated connections unless a multiplexer and a demultiplexer are situated upstream and downstream of these units.

I claim:

1. A method for monitoring, via monitoring means, a signal which is transmitted via at least one telecommunication link and with said signal comprising at least a signalling signal and a content signal, wherein the method comprises the steps of:
    detecting, by the monitoring means, at least one code word situated in the signalling signal so as to form a detected word code;
    monitoring, by the monitoring means and in response to the detected code word, at least a part of the content signal;
    generating, by the monitoring means and in response to the detected code word, a further signalling signal; and
    transmitting, by the monitoring means and in response to the further signalling signal, the part of the content signal which is monitored to processing means defined by the further signalling signal.

2. The method in accordance with claim 1 further comprising the steps of:
    transmitting a first authentication code from one side to another side;
    generating, at the other side and in response to a key code and the first authentication code, a second authentication code;
    transmitting the second authentication code from the other side to the one side;
    generating, at the one side and in response to the key code and the first authentication code, a third authentication code;
    comparing the second and the third authentication codes at the one side; and
    transmitting, in case of equality of the second and the third authentication codes, the part of the content signal which is monitored to the processing means.

3. The method in accordance with claim 1 further comprising the steps of:
    generating, by the monitoring means and in response to the detected code word, a describing signal, before the part of the content signal which is monitored is transmitted to the processing means; and
    transmitting, by the monitoring means, the describing signal to the processing means.

4. The method in accordance with claim 1 further comprising the steps of:
    buffering in a memory, by the monitoring means, the part of the content signal which is monitored; and
    reading, by the monitoring means, the part of the content signal which is to be monitored from the memory and transmitting, in a delayed manner in time, the part of the content signal so read out to the processing means.

5. The method in accordance with claim 1 wherein the further signalling signal comprises a destination code which defines the processing means, a monitor code related to the code word and a signal type code which defines a signal type.

6. A monitoring system having monitoring means for monitoring a signal transmitted via at least one telecommunication link which signal comprises at least a signalling signal and a content signal, and having processing means which can be coupled to the monitoring means, said monitoring means comprising:
    a detecting device for detecting at least one code word situated in the signalling signal so as to form a detected code word; and
    a monitoring device for monitoring, in response to the detected code word, at least a part of the content signal; and
said processing means comprises:
    a processing device for processing at least the part of the content signal which is monitored; and
wherein the monitoring means further comprises a controlling device comprising:
    a generating device for generating in response to the detected code word, a further signalling signal; and
    a transmitting device for transmitting, in response to the further signalling signal, at least the part of the content signal which is monitored to the processing means as defined by the further signalling signal.

7. The monitoring system in accordance with claim 6 wherein the monitoring device further comprises:
    an authentication receiving device for receiving an authentication code originating from the processing means;
    an authentication calculating device for calculating, in response to a key code and the first authentication code, a second authentication code;
    an authentication transmitting device for transmitting the second authentication code to the processing means; and
    a further authentication receiving device for receiving an authentication permission code originating from the processing means;
with the processing means further comprising:
    an authentication generating device for generating the first authentication code;
    a further authentication calculating device for calculating, in response to the key code and the first authentication code, a third authentication code;

a still further authentication receiving device for receiving the second authentication code originating from the monitoring device;

an authentication comparing device for comparing the second and the third authentication codes; and a further authentication transmitting device for transmitting, in case of equality of the second and the third authentication codes, to the monitoring device, the authentication permission code for granting permission for transmitting at least the part of the content signal which is monitored to the processing means.

8. The monitoring system in accordance with claim 6 wherein the monitoring device further comprises:

a further generating device for generating, in response to the detected code word and before at least the part of the content signal which is monitored is transmitted to the processing means, a describing signal; and a further transmitting device for transmitting the describing signal to the processing device.

9. The monitoring system in accordance with claim 6, wherein the monitoring device further comprises:

a memory device for buffering at least the part of the content signal which is monitored; and a memory controlling device for reading out the part of the content signal which is to be monitored from the memory device and for transmitting delayed in time at least the part of the content signal so read out to the processing device.

10. The monitoring system in accordance with claim 6 wherein the monitoring device further comprises:

a first code generating device for generating a destination code which defines the processing device;

a second code generating device for generating a monitor code related to the one code word; and a third code generating device for generating a signal type code which defines a signal type, with the processing means further comprising:

a first code detecting device for detecting the monitor code related to the one code word; and a second code detecting device for detecting the signal type code.

11. Apparatus for a monitor controlling device and monitoring means, the monitoring means being coupled to the monitor controlling device and monitoring a signal transmitted via at least one telecommunication link wherein the signal comprises at least a signalling signal and a content signal, wherein said monitoring means comprises:

a detecting device for detecting at least one code word situated in the signalling signal so as to form a detected code word; and a monitoring device for monitoring, in response to the detected code word, at least a part of the content signal wherein the monitor controlling device comprises:

a generating device for generating, dependent on the detected code word, a further signalling signal; and a transmitting device for transmitting, in response to the further signalling signal, at least the part of the content signal which is monitored to processing means defined by the further signalling signal.

12. The apparatus recited in claim 11 wherein the monitor controlling device further comprises:

an authentication receiving device for receiving a first authentication code originating from the processing means;

an authentication calculating device for calculating, in response to a key code and the first authentication code, a second authentication code;

an authentication transmitting device for transmitting the second authentication code to the processing means; and a further authentication receiving device for receiving an authentication permission code, originating from the processing means, for obtaining permission for transmitting at least part of the content signal which is monitored to the processing means.

13. The apparatus recited in claim 11 wherein the monitor controlling device further comprises:

a further generating device for generating, in response to the detected code word and before at least the part of the content signal which is monitored is transmitted to the processing means, a describing signal; and a further transmitting device for transmitting the describing signal to the processing means.

14. The apparatus recited in claim 11 wherein the monitor controlling device further comprises:

a memory device for buffering at least the part of the content signal which is monitored; and a memory controlling device for reading out the part of the content signal which is monitored from the memory device and for transmitting the part of the content signal so read out delayed in time to the processing device.

15. The apparatus recited in claim 11 wherein the monitor controlling device further comprises:

a first code generating device for generating a destination code which defines the processing device;

a second code generating device for generating a monitor code related to the one code word; and a third code generating device for generating a signal type code which defines a signal type.

16. Apparatus having processing means and monitoring means, the processing means being coupled to the monitoring means and monitoring a signal transmitted via at least one telecommunication link, the signal having at least a signalling signal and a content signal, wherein said monitoring means comprises:

a detecting device for detecting at least one code word situated in the signalling signal such as to form a detected code word; and a monitoring device for monitoring, in response to the detected code word, at least a part of the content signal; and wherein said processing means comprises:

a processing device for processing at least the part of the content signal which is monitored; and a first code detecting device for detecting a monitor code originating from the monitoring means and related to the one code word.

17. The apparatus recited in claim 16 wherein the processing means further comprises:

a second code detecting device for detecting a signal type code originating from the monitoring means and defining a signal type.

18. The apparatus recited in claim 16 wherein the processing means further comprises:

an authentication generating device for generating a first authentication code;

a further authentication calculating device for calculating, dependent on a key code and the first authentication code, a third authentication code;

a still further authentication receiving device for receiving a second authentication code originating from the monitoring means;

an authentication comparing device for comparing the second and the third authentication codes; and a further authentication transmitting device for transmitting, in response to equality of the second and third authentication codes, an authentication permission code to the monitoring means for granting permission for transmitting at least the part of the content signal which is monitored to the processing means.

* * * * *